July 26, 1932.  R. TEATS  1,869,213
PROCESS OF SEPARATING METALS
Filed April 6, 1926   2 Sheets-Sheet 2

INVENTOR
Roscoe Teats
BY
Albert M. Austin
ATTORNEY

Patented July 26, 1932

1,869,213

UNITED STATES PATENT OFFICE

ROSCOE TEATS, OF DENVER, COLORADO, ASSIGNOR TO AMERICAN SMELTING AND REFINING COMPANY, OF NEW YORK, N. Y., A CORPORATION OF NEW JERSEY

PROCESS OF SEPARATING METALS

Application filed April 6, 1926. Serial No. 100,044.

This invention relates to the art of separation of metals, particularly cadmium, from ores, furnace products, flue dusts, bag house dusts, and the like.

The invention further relates to the separation of other metals, particularly zinc, lead, arsenic and thallium, which may be contained in materials treated for cadmium.

The invention further consists in the new and novel features of operation and the new and original arrangements and combinations of steps in the process hereinafter described and more particularly set forth in the claims.

Figure 1:
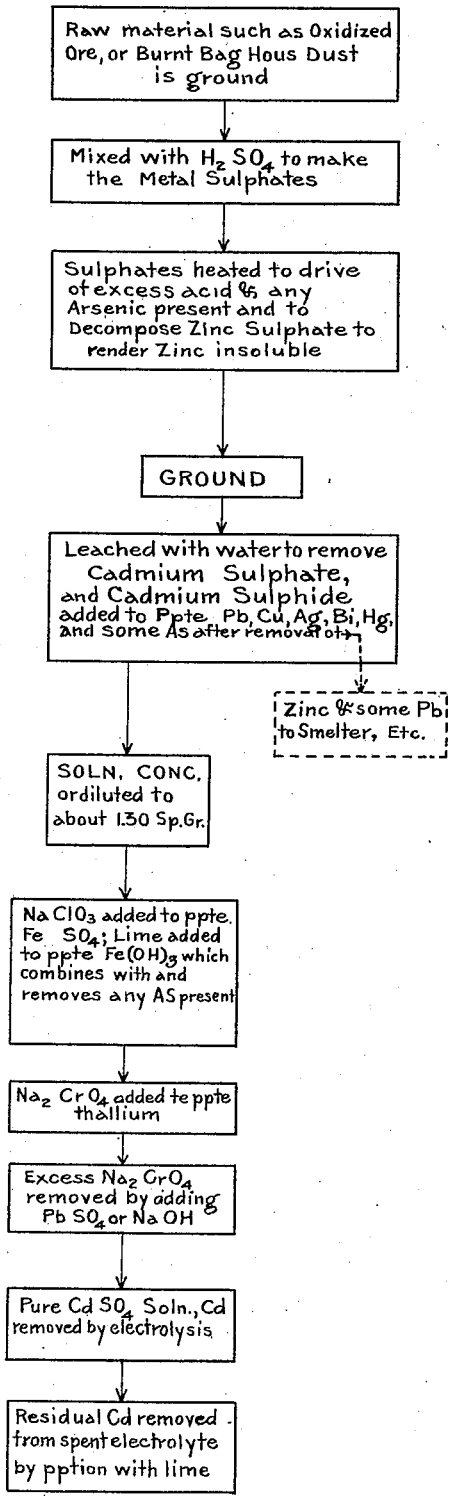
Figure 2:
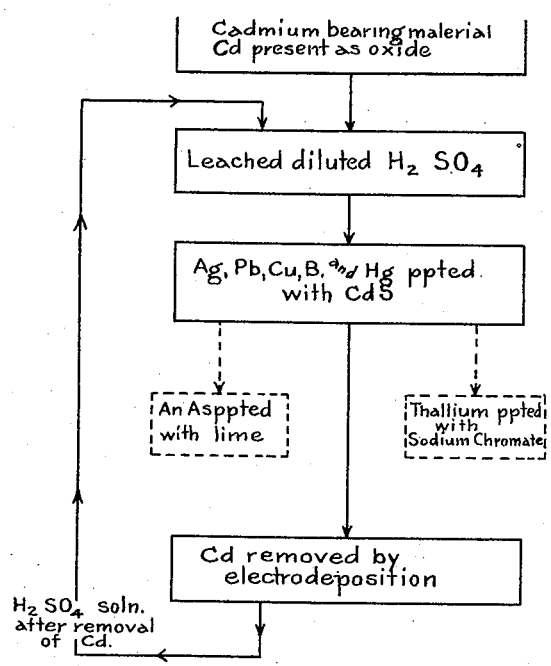

In the accompanying drawings:

Fig. 1 is a flow sheet diagram illustrating steps and side steps from the preparation of raw material containing cadmium to the final electrolysis of pure cadmium from a solution purified from other metals and to the precipitation of cadmium, residual from the electrolytic deposition; and Fig. 2 is a condensed flow sheet including the step of utilizing spent cadmium electrolyte for leaching the raw cadrium bearing material.

Materials suitable for treatment according to this invention in addition to cadmium may contain silver, lead, zinc, arsenic, antimony, bismuth, copper, iron manganese, selenium, tellurium and thallium, and other metals or compounds thereof.

An example of the composition of raw material treated by this process is as follows: 5% to 35% lead, 10% to 70% cadmium, 1% to 20% zinc, 0% to 15% arsenic and other metals in amounts usually less than 1% and comprising antimony, bismuth, silver, copper, iron, manganese, selenium, tellurium and thallium. In some cases the material is concentrated, as for example, to the following approximate composition: 7% to 10% lead, 50% to 60% cadmium, 1% to 10% zinc, 0% to 12% arsenic and small percentages of a large number of other elements.

In the practice of the processes and steps of this invention raw material such as ores, furnace products, flue dusts, bag house dusts, and the like, are employed, the cadmium and other metals being in the oxidized state or in an equivalent state as regards the later step of sulphating. The raw material is finely ground and mixed with sulphuric acid to convert all the metal products present to the sulphates.

The mixture is heated in a furnace at a temperature between 600 degrees centigrade and 800 degrees centigrade to drive off excess acid and any arsenic that may volatilize. When the mixture is heated between the temperatures given above zinc sulphate is decomposed or altered so that when the material is leached with water a large percentage of the zinc will remain insoluble. The length of time the material is heated varies from two to six hours depending on the chemical and physical condition of the material. When finished, the material is drawn from the furnace and finely ground in a ball or rod mill. After grinding it is leached with water to dissolve cadmium sulphate. During the leaching process cadmium sulphide is added when necessary to remove any impurities such as lead, copper, bismuth, mercury and part of any arsenic that may be dissolved by the water. The precipitates are separated from the solutions which are then concentrated by evaporation to about 1.30 specific gravity. Or if higher in specific gravity the solutions are diluted with water to 1.30 specific gravity. Any ferrous sulphate is oxidized by the addition of sodium chlorate and lime added in small amounts until the solution is nearly neutral to methyl orange. The solution is then boiled to precipitate the iron as ferric hydroxide. The ferric hydroxide combines with any arsenic that may be in the solutions and takes the arsenic out of the solutions.

Thallium is next removed from the solution by the addition of sodium chromate, the thallium chromate settling to the bottom of the tank. The excess sodium chromate is removed from the solution by the addition of lead sulphate or by reduction to chromic sulphate with sodium bisulphite and precipitation with caustic soda.

The cadmium sulphate solutions are now removed from the precipitates and are ready for electrolysis. An electrolyte containing 100 grams of cadmium per liter has been used. The anode is in some cases made of ferrosilicon. The cathode is preferably made of cadmium sheets that have been previously deposited and removed from an aluminum cathode. The cadmium cathodes may be melted in an ordinary pot furnace without the addition of any flux and cover such as oil, paraffin, beeswax or caustic soda.

The spent electrolyte which may contain from two to six grams of cadmium per liter may be treated with excess of lime to neutralize the sulphuric acid and precipitate from the solutions the remaining cadmium as cadmium hydroxide. Any zinc in the electrolyte is not precipitated by lime but remains in solution after the cadmium has settled out. If it is desired to utilize the sulphuric acid in the spent electrolyte, all or a portion of spent electrolyte may be returned to the beginning and used to sulphate the raw cadmium dust. When desired, the spent electrolyte may be concentrated for using it to sulphate new quantities of material to be treated. Any zinc that may be present in the spent solutions will be partially broken up in the heat treatment given the dust in the calcining furnace.

It is found when the mixture of raw dust and sulphuric acid is heated between 600 and 800 degrees centigrade that from 50% to 80% of the zinc is rendered insoluble in the leaching waters. The zinc passes out of the process along with the lead sulphate residues from the leaching operation and may be sent to the lead smelter for recovery of lead.

Although I have shown and described and have pointed out in the annexed claims certain novel features of the invention, it will be understood that various omissions, substitutions and changes in the novel steps of the process and in its operation may be made by those skilled in the art without departing from the spirit of the invention.

Having described my invention, I claim:

1. The process of separating metals from ores and like material containing cadmium, zinc, lead, arsenic, tellurium and similar metals, consisting in mixing said material with sulphuric acid to make the metal sulphates, heating the sulphates to decompose zinc sulphate to render the zinc material insoluble, leaching with water to remove cadmium sulphate, adding cadmium sulphide to precipitate any lead, copper, silver, bismuth, mercury or arsenic present, and separating the cadmium sulphate solution from the precipitated materials.

2. The process of separating metals from ores and like material containing cadmium, zinc, lead, arsenic, tellurium and similar metals, consisting in mixing said material with sulphuric acid to make the metal sulphates, heating the sulphates to decompose zinc sulphate to render the zinc material insoluble, leaching with water to remove cadmium sulphate, bringing the concentration of the cadmium sulphate solution to about 1.3 specific gravity, adding sodium chlorate to oxidize ferrous sulphate to ferric sulphate, adding lime in sufficient quantity only to precipitate ferric hydroxide, and removing substantially pure cadmium sulphate solution from the precipitates.

3. The process of separating metals from ores and like material containing cadmium, zinc, lead, arsenic, tellurium and similar metals, consisting in mixing said material with sulphuric acid to make the metal sulphates, heating the sulphates to decompose zinc sulphate to render the zinc material insoluble, leaching with water to remove cadmium sulphate, bringing the concentration of the cadmium sulphate solution to about 1.3 specific gravity, adding sodium chromate to precipitate thallium, removing the excess sodium chromate, and removing substantially pure cadmium sulphate solution from the precipitates.

4. The process of separating metals from ores and like material containing cadmium, zinc, lead, arsenic, tellurium and similar metals, consisting in mixing said material with sulphuric acid to make the metal sulphates, heating the sulphates to decompose zinc sulphate to render the zinc material insoluble, leaching with water and cadmium sulphide to remove cadmium sulphate, bringing the concentration of the cadmium sulphate solution to about 1.3 specific gravity, and removing substantially pure cadmium sulphate solution from the precipitates.

5. The process of separating metals from material containing cadmium, zinc and other metals, which consists in converting the metals into sulphates, heating the sulphates to render the zinc material insoluble, removing cadmium sulphate as a solution, concentrating said solution to an appropriate specific gravity, precipitating any iron compounds, and separating the cadmium sulphate solution from the precipitates.

6. The process of separating metals from material containing cadmium and other metals, which consists in converting the metals into sulphates, leaching with water to dissolve the cadmium sulphate, removing cadmium sulphate as a solution, concentrating said solution to an appropriate specific gravity, removing any iron and thallium, and separating the cadmium sulphate solution from the precipitates.

7. The process of separating metals from ores and like material containing cadmium, zinc, lead, arsenic, tellurium and similar metals, consisting in mixing said material with sulphuric acid to make the metal sulphates, heating the sulphates to drive off excess acid and any volatile arsenic present and to decompose zinc sulphate to render the zinc sulphate insoluble, grinding the dried material, leaching with water to remove cadmium sulphate, adding cadmium sulphide to precipitate any lead, copper, silver, bismuth, mercury or arsenic present, separating the cadmium sulphate solution and the precipitated materials, bringing the concentration of the cadmium sulphate solution to about 1.3 specific gravity, adding sodium chlorate to oxidize ferrous sulphate, adding lime to precipitate ferric hydroxide, adding sodium chromate to precipitate thallium, removing the excess sodium chromate, removing pure sulphate solution from the precipitates, depositing cadmium from the sulphate solution by electrolysis, adding only sufficient lime to the spent electrolyte to precipitate any residual cadmium, and after utilizing the spent electrolyte to leach additional quantities of raw material, breaking up any zinc sulphate in the residual electrolyte during the roasting of the sulphated raw material.

8. The process of separating cadmium from cadmium sulphate solution containing various other metals as impurities, which comprises adding cadmium sulphide to precipitate lead, copper, silver, bismuth and mercury as precipitates, and removing the cadmium sulphate from the presence of the precipitates.

9. The process of separating cadmium from cadmium sulphate solution containing various other metals as impurities, which comprises adding cadmium sulphide to precipitate lead, copper, silver, bismuth and mercury removing the cadmium sulphate solution, adding sodium chlorate to oxidize ferrous sulphate, adding lime to precipitate ferric hydroxide, and adding sodium chromate to precipitate thallium.

10. A process for the recovery of cadmium from cadmium bearing compounds, comprising treating the materials with sulphuric acid under reaction conditions sufficient to insure the formation of cadmium sulphate, removing the uncombined acid, leaching with water, and during the leaching adding cadmium sulphide thereby precipitating metallic impurities as sulphides.

11. As a step in the extraction of cadmium from cadmium bearing materials in which cadmium sulphate is formed and is leached with water, the addition of cadmium sulphide during leaching to precipitate metallic impurities as sulphides.

12. A process for the recovery of cadmium from cadmium bearing materials, comprising adding sulphuric acid to the material, heating to expel uncombined sulphuric acid, then leaching with water, and during leaching adding cadmium sulphide.

13. A process for the recovery of cadmium from cadmium bearing material, comprising adding sulphuric acid to the material; heating to expel uncombined sulphuric acid, then leaching with water, and during leaching adding cadmium sulphide whereby metallic impurities are precipitated as sulphides.

14. The process of separating metals from material containing cadmium and other metals which consists in converting the metals into sulphates, heating the sulphates to decompose zinc sulphate and render the zinc insoluble, leaching with water to dissolve the cadmium sulphate and during the leaching adding a cadmium sulphide whereby metallic impurities are precipitated.

In testimony whereof, I have hereunto set my hand.

ROSCOE TEATS.